May 1, 1923.
W. McKENNITT
AGRICULTURAL MACHINE
Filed Feb. 7, 1921
1,453,631
2 Sheets-Sheet 1
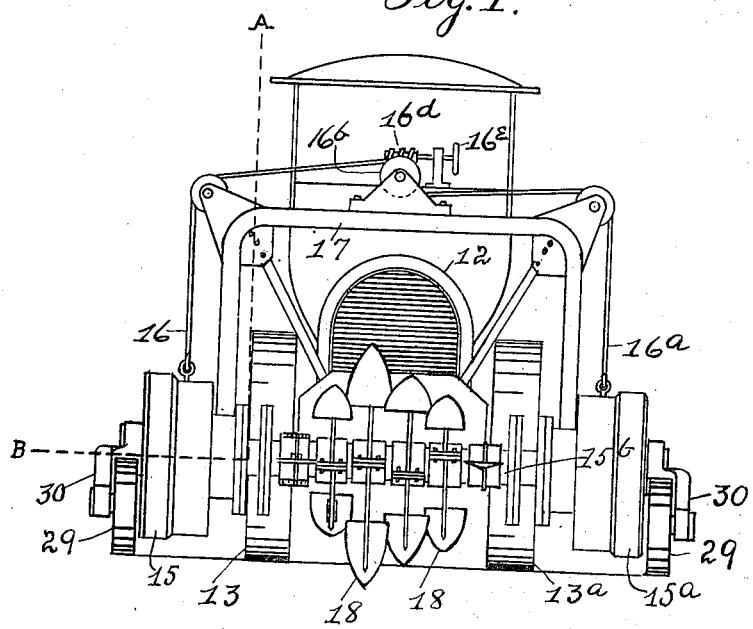
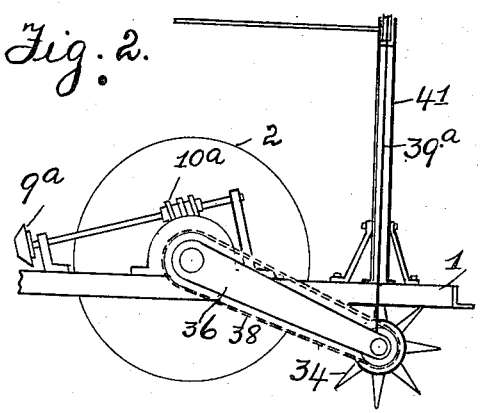
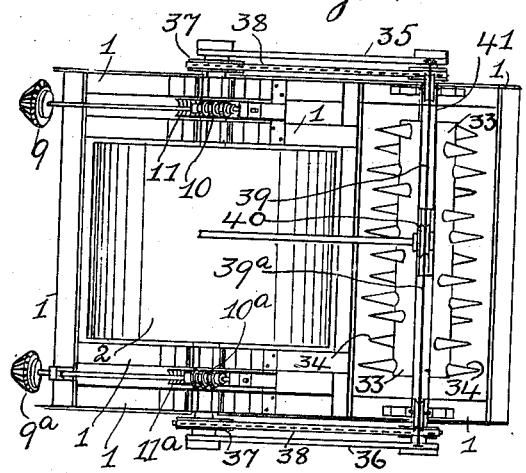
Witnesses
Inventor
William McKennitt
By James T. Watson
Attorney May 1, 1923.
W. McKENNITT
AGRICULTURAL MACHINE
Filed Feb. 7, 1921
1,453,631
2 Sheets-Sheet 2
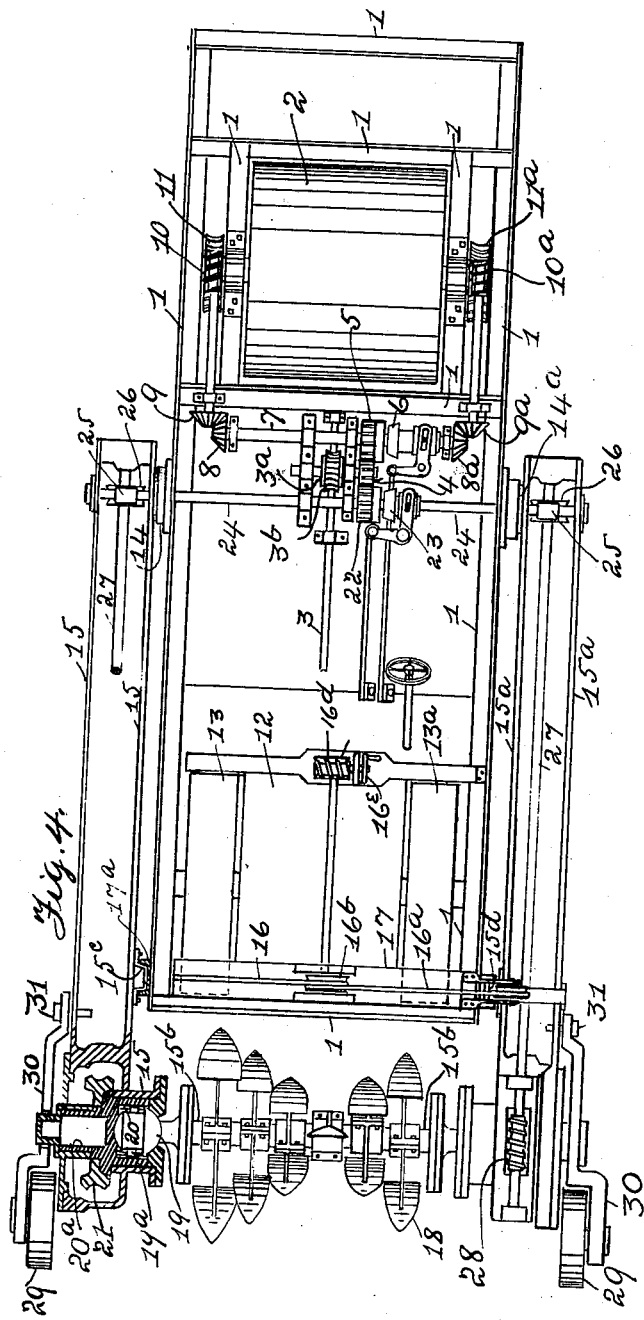
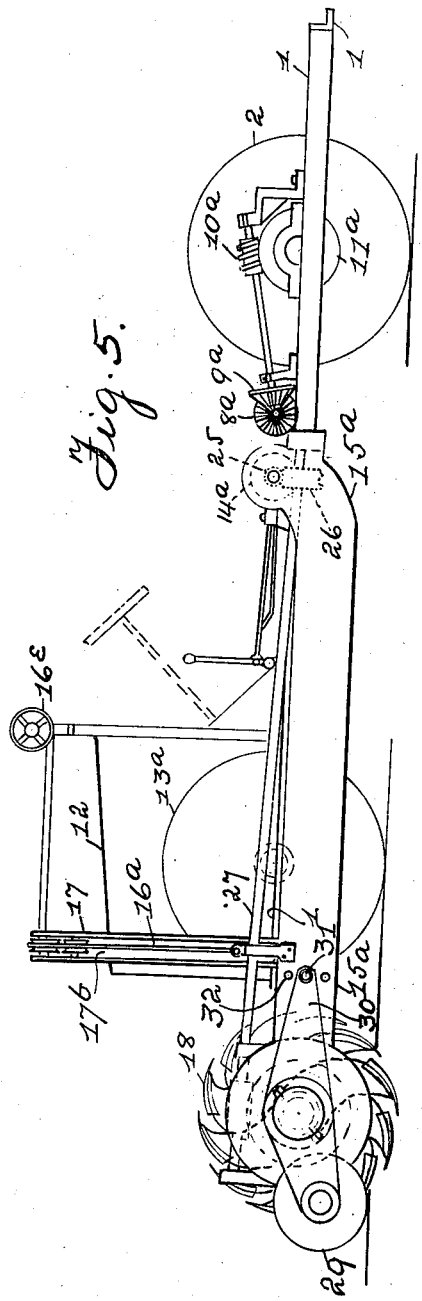
Witnesses
INVENTOR
William McKennitt
BY James T. Watson
ATTORNEY Patented May 1, 1923.

1,453,631

UNITED STATES PATENT OFFICE.

WILLIAM McKENNITT, OF DULUTH, MINNESOTA.

AGRICULTURAL MACHINE.

Application filed February 7, 1921. Serial No. 443,202.

*To all whom it may concern:*

Be it known that I, WILLIAM McKENNITT, a citizen of the United States, residing at Duluth, in the county of St. Louis and State of Minnesota, have invented certain new and useful Improvements in Agricultural Machines, of which I do declare the following to be a specification.

My invention relates to agricultural machines, and has for its object the provision of an improved plowing or cultivating machine. It consists of the structures, combinations and arrangements of parts hereinafter described and claimed.

In the drawings, Fig. 1, is a front elevation of one form of my said invention. Fig. 2 is a fragmentary side elevation of a modified form of my said invention showing the hereinafter described harrow mechanism. Fig. 3 is a top plan view of the parts shown in Fig. 2. Fig. 4, is a top plan view, partly in vertical longitudinal section on the line A—B of Fig. 1. Fig. 5, is a side elevation of said invention, omitting said harrow.

In the drawings, 1, is a body frame of any suitable structure, the rear end of which is preferably mounted upon a wide wheel or roller, 2, adapted to be driven by any suitable engine, not shown, through any suitable transmission means, as the shaft 3, worm $3^a$, worm wheel $3^b$, pinion 4, loose gear 5, splined clutch 6, shaft 7, pinions 8, $8^a$, gears 9, $9^a$, worms 10, $10^a$, worm wheels 11, $11^a$. Said engine, not shown, is preferably located in a hood 12, at the forward end of the vehicle, as is common in automobiles and is well known to the art. The forward end of said frame is preferably supported upon two narrower wheels as 13, $13^a$.

Pivotally mounted at one end on said frame by any suitable means or in any suitable manner, as at 14, $14^a$, is a yoke comprising side arms 15, $15^a$, and a rotatable transverse shaft $15^b$, extending between said side arms near their forward ends. Intermediate of its ends, said yoke is supported by adjusting means of any suitable structure, as cables 16, $16^a$, which cables are secured at one end to said side arms and at their opposite ends to a winding drum $16^b$, mounted upon a bridge 17 extending transversely of said frame 1, at or near the forward end thereof. Said drum is preferably adapted to be operated by a worm wheel $16^c$, worm $16^d$ and hand wheel $16^e$, positioned near the operator's station on said frame. Said bridge preferably has vertical guideways $17^a$, $17^b$, formed in its ends, adapted to engage guide blocks $15^c$, $15^d$ provided on said side arms.

Depending from each side of said yoke, at any suitable point, as near its forward end, is a supporting contour wheel 29 which is adapted to follow the contour of the ground. Said contour wheel is adjustably secured to said yoke in any suitable manner, as by a journal-arm 30 upon one end of which said wheel is journalled and which arm itself is, intermediate of its ends, journalled upon a hub formed on the side of the side arm of the yoke. The opposite end of said journal arm is apertured to receive a pin 31 which is adapted to extend into one or another of a series of holes 32 formed in the side arm of said yoke in rear of said hub, whereby the rearward end of said journal arm may be moved in a vertical plane and fixed at a greater or less elevation thus elevating or depressing said contour wheel.

Mounted upon said shaft $15^b$ and adapted to turn therewith, are a plurality of ground-disturbing implements of any suitable structure, such as plows, cultivators or spades 18, which are preferably arranged in pairs, the members of each pair being diametrically opposite each other, and the several pairs being staggered with respect to each other.

Said shaft $15^b$ is preferably provided at each end with a flexible joint connection with said side arms, comprising a modified ball 19 provided with peripheral gear teeth $19^a$, adapted to engage an internal gear or rotatable socket 20. Said ball is preferably reduced in the spaces between the teeth, and said spaces are preferably a little longer than the teeth of said internal gear so that a little play is permitted. Said internal gears are journalled in the corresponding side arms, and are respectively provided with a hub $20^a$, upon which is keyed a worm wheel 21. The worm wheels 21, are adapted to be driven by said engine, not shown, through any suitable transmission, as said shaft 3, worm $3^a$, worm wheel $3^b$, pinion 4, and through a loose gear 22, splined clutch 23, shaft 24, worms 25, 25, worm wheels 26, 26, shafts 27, 27 and worms as 28; the shaft 24 and the worms 25, 25 carried thereby being concentric with the pivots of said side arms.

By locating the plows, spades or cultivators at the forward end of the machine, I enable the operator to easily watch their operation and at the same time to watch for any serious obstacles in the path of their operation; also the roller 2 is then in a position to roll the plowed or cultivated ground firmly for seeding.

At the rearward end of said vehicle, I preferably provide a harrow (Figs. 2 and 3), comprising a rotatable shaft 33 upon which are mounted ground disturbing implements of any suitable character, as teeth 34, which shaft is journalled at its opposite ends in side arms 35 and 36, respectively, which arms are journalled at their forward ends upon the axle of said wheel 2. Said harrow shaft is adapted to be driven by said engine through any suitable power transmission, as by means of one or more sprocket wheels 37 keyed to the axle of said wheel 2 and adapted to drive a sprocket chain or chains 38, which are adapted to engage corresponding sprocket wheels keyed to the harrow shaft 33. Said harrow may be lifted out of engagement with the ground, or adjusted at a greater or less elevation with respect thereto by means of cables 39, 39ª secured to said side arms 35, 36, and to a windlass 40 mounted on a bridge 41 erected on said frame 1; the construction and operation of said adjusting means being approximately similar to the adjusting cable mechanism for raising or lowering the plow-supporting yoke at the forward end of said vehicle.

A separate seeder (not shown), machine may follow said harrow, or may also be built upon the rearward end of said vehicle.

Said plows or spades 18, are preferably staggered so that no two plows will engage the ground at the same time, but the plow shaft is preferably so geared as to rotate much more rapidly than the vehicle driving roller, thus enabling the cuts of each plow or spade to longitudinally overlap the previous cut of the same plow or spade, or of the other plow or spade of the same pair. Also the plows or spades are preferably so arranged that one pair will slightly overlap the side of the adjoining pair, whereby the cuts are made to overlap.

The depth of the cut is determined by the elevation of the front end of said yoke, which is governed by said cables.

It is obvious that said construction may be altered or modified in various particulars within the spirit and scope of certain of my claims.

What I claim is—

The combination with a vehicle of a yoke pivotally supported near one end upon said vehicle and including a transversely directed rotatable shaft near the forward end of said vehicle, said shaft being supported and adapted to be rotated by internal gears journalled in the side arms of said yoke, means for driving said gears, means for supporting said yoke intermediate of its pivotal point and said shaft, ground disturbing implements mounted on said shaft and adapted to rotate therewith, and means for driving said vehicle.

In testimony whereof, I hereunto affix my signature, in presence of two witnesses.

WILLIAM McKENNITT.

Witnesses:
  ALICE M. LOVELACE,
  OLGA E. BROMAN.